United States Patent
Neumann

(10) Patent No.: US 6,792,270 B1
(45) Date of Patent: Sep. 14, 2004

(54) DEVICE FOR DETERMINING THE BASE STATION SUBSYSTEMS INVOLVED IN A PAGING, AND METHOD FOR THE AUTOMATIC SET-UP OF THE DEVICE

(75) Inventor: Roger Neumann, Aachen (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/567,541

(22) Filed: May 5, 2000

(30) Foreign Application Priority Data

May 7, 1999 (EP) ............................................. 99109043

(51) Int. Cl.$^7$ ............................................... H04Q 7/20
(52) U.S. Cl. ................................ 455/432.1; 455/435.1; 370/338; 370/328
(58) Field of Search ............................. 455/456.1, 453, 455/458, 432, 435.1, 433, 426, 560, 445; 370/379, 465, 328, 338

(56) References Cited

U.S. PATENT DOCUMENTS

| | | | | |
|---|---|---|---|---|
| 5,958,006 A | * | 9/1999 | Eggleston et al. | 709/219 |
| 6,081,723 A | * | 6/2000 | Mademann | 455/456 |
| 6,104,929 A | * | 8/2000 | Josse et al. | 455/445 |
| 6,119,012 A | * | 9/2000 | Amirijoo | 455/456 |
| 6,233,458 B1 | * | 5/2001 | Haumont et al. | 455/445 |
| 6,317,421 B1 | * | 11/2001 | Wilhelmsson et al. | 370/328 |
| 6,356,838 B1 | * | 3/2002 | Paul | 701/209 |
| 6,438,375 B1 | * | 8/2002 | Muller | 455/435 |
| 6,628,645 B2 | * | 9/2003 | Scheurich | 370/353 |
| 6,661,782 B1 | * | 12/2003 | Mustajarvi et al. | 370/331 |

FOREIGN PATENT DOCUMENTS

DE 19611947 6/1997

OTHER PUBLICATIONS

Antipolis, S.; "Digital Cellular Telecommunications System (Phase 2+); General Packet Radio Service (GPRS); Base Station System (BSS)—Serving GPRS Support Node (SGSN); BSS GPRS Protocol (BSSGP) (GSM 08.18 version 6.2.0 Release 1997)"; European Telecommunications Standard Institute (ETSI), pp. 1–62 (XP002122606) (TS101343).

Antipolis, S.; "Digital Cellular Telecommunications System (Phase 2+); General Packet Radio Service (GPRS); Base Station System (BSS)—Serving GPRS Support Node (SGSN) Interface; Network Service (GSM 08.16 verion 6.1.0 Release 1997)"; European Telecommunications Standard Institute (ETSI), pp. 1–51 (XP–002122607) (TS101299).

Gerling, J.C.J., European Search Report, App. No. 99109043.2, Nov. 15, 1999, pp. 1–3.

* cited by examiner

Primary Examiner—Tilahun Gesesse

(57) ABSTRACT

The invention relates to a device for a GSM (Global System for Mobile Communication) communication system offering a GPRS (General Packet Radio Service), for determining the base station subsystems involved in a paging on a routing area level. Moreover, the invention relates to a method for setting up and/or updating the device. The set-up and/or the update of the device takes place in a GPRS service node, for example, after the receipt of a message on a set-up, a release or a modification of virtual connections. For this purpose the information contained in the message are evaluated and compared with already existing information. Another possibility is the evaluation of information in data packets, which, too, are compared with already existing information. Subsequently the information is, if required, updated and stored. In the case of a paging on a routing area level the stored information is used for communicating the signaling addresses of base station subsystems, which supply the routing area, to a GPRS service node. The information is also used for detecting as to which routing areas are supplied by a GPRS service node.

24 Claims, 7 Drawing Sheets

FIG. 3a

Figure 1:
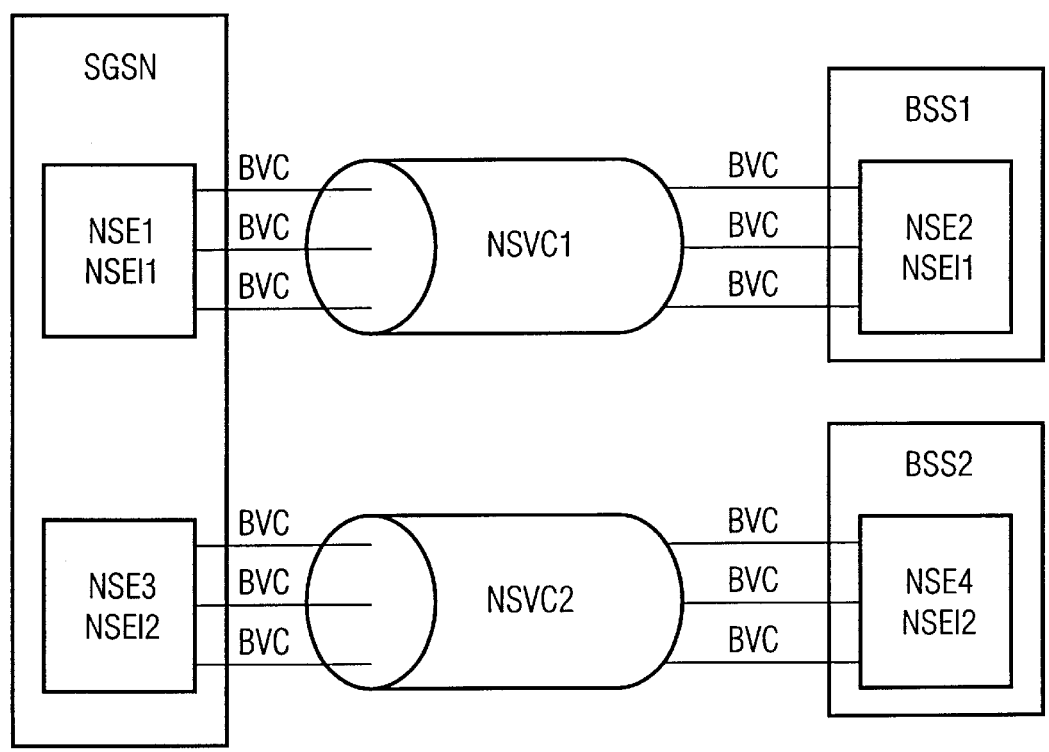

| NSEI | RAI | CGI |
|---|---|---|
| a | 1 | 1 |
| a | 1 | 2 |
| a | 1 | 3 |
| b | 1 | 4 |
| b | 1 | 5 |

FIG. 3b

| NSEI | RAI |
|---|---|
| a | 1 |
| a | 1 |
| a | 1 |
| b | 1 |
| b | 1 |

FIG. 3c

| NSEI | RAI | CNT |
|---|---|---|
| a | 1 | 3 |
| b | 1 | 2 |

DEVICE FOR DETERMINING THE BASE STATION SUBSYSTEMS INVOLVED IN A PAGING, AND METHOD FOR THE AUTOMATIC SET-UP OF THE DEVICE

The invention relates to a device for a GSM (Global System for Mobile Communication) communication system offering a GPRS (General Packet Radio Service), for determining the base station subsystems involved in a paging on a routing area level. Moreover, the invention relates to a method for setting up and/or updating the device.

In order to reach a mobile terminal, which is attached to a GPRS and which is ready to operate, the so-called stand-by mode, a paging is performed. A paging can be performed for packet-switched and circuit-switched connection requests. A paging for a packet-switched connection request is performed by a GPRS service node (Supporting GPRS Service Node) on a routing area level. With regard to a circuit-switched connection request, a paging is performed in response to the network operation mode. If a GSM communication system offering a GPRS is operated in the network operation mode I, said paging—for a circuit-switched connection—is requested by a mobile services switching center and is executed by a GPRS service node. The paging is executed on a routing area level and can cover one or several routing areas. For the purpose of the execution, the GPRS service node informs each base station subsystem involved in a paging by sending a message to the network service entity thereof. The base station subsystem or the base station subsystems thereupon transmit a paging request in the corresponding routing areas. If the searched for terminal is reached, it responds to the a base station subsystem with a paging response. The base station subsystem informs the GPRS service node by means of a paging response.
(Stage 2, ETSI Standard GSM 03.60 Version 6.2.0, Release 1997; July 1998)

It is prior art that the information as to which base station subsystems are involved in a paging can be obtained from an allocation of routing areas identities to network service entity identifiers.
(ETSI Standard 8.16 TS 101 299 V6.1.0, Annex C, Release 1998; July 1998)

It cannot be inferred from the prior art as to how means which determine and evaluate such an allocation can be set up. One possibility to set up such an allocation is the manual input, which is costly and subject to errors. It can neither be inferred from the prior art as to whether and how such means can be used beyond the determination of the base station subsystems involved in a paging.

In accordance therewith it is object of the invention to develop a device and a method for the automatic set-up and/or update of such means. It is, moreover, an object of the invention to develop a method using said means beyond the determination of the base station subsystems involved in a paging.

According to the invention said object is provided by the teaching of patent claim 1, the teaching of patent claim 5 and the teaching of patent claim 14.

It has thereby shown to be advantageous that the method allows for the automated set-up of a device, which informs a GPRS service node about network service entity identifiers of base station subsystems involved in a paging on a routing area level. In contrast to a device which has to be set up and updated manually, working time is thereby saved and errors are avoided.

Furthermore, it proves to be an advantage that the means for allocating a routing area identity to network service entity identifiers are updated immediately after each modification of virtual connections, whereby a valid allocation is available in the device at any time.

It is equally an advantage that said device is set up with only small signaling efforts and that only small transmission capacities are bound thereby remaining available for telecommunication purposes.

It is, moreover, advantageous that the device for obtaining a routing area identity can be realized in a simple manner with means for converting data.

It is equally advantageous that the device for obtaining a cell global identifier can be realized in a simple manner with means for converting data.

Further advantageous embodiments can be inferred from claims 2 to 13 and 15 to 25.

According to claim 7 and claim 18 it is an advantage that the identification of a base station subsystem is implemented by means of a network service entity identifier, as a GPRS service node uses said network service entity identifier for addressing the base station subsystems thereby avoiding additional conversions.

It is also advantageous according to claim 8 and claim 19 to implement the identification of a routing area by means of a routing area identity, as said routing area identity can be determined with little effort.

According to claims 9 to 11 and 20 to 22 it is also an advantage to make a difference between individual virtual connections thereby facilitating a possible check of stored data.

Another advantage according to claim 3 and claim 23 is also the feasibility of multiple entries. Said multiple entries allow for a set-up and/or update of the allocating means in very few steps.

Additional advantages result according to claim 4 and claim 24 in the additional storage of a counter value, which reduces the number of elements in the allocating means.

According to claim 13 and claim 26 the use of the information stored in the allocating means is particularly advantageous for determining as to which routing areas are supplied by a GPRS service node thereby avoiding the set-up, storage and administration of redundant information, which otherwise only use up working time, memory space and computer power.

Figure 2:
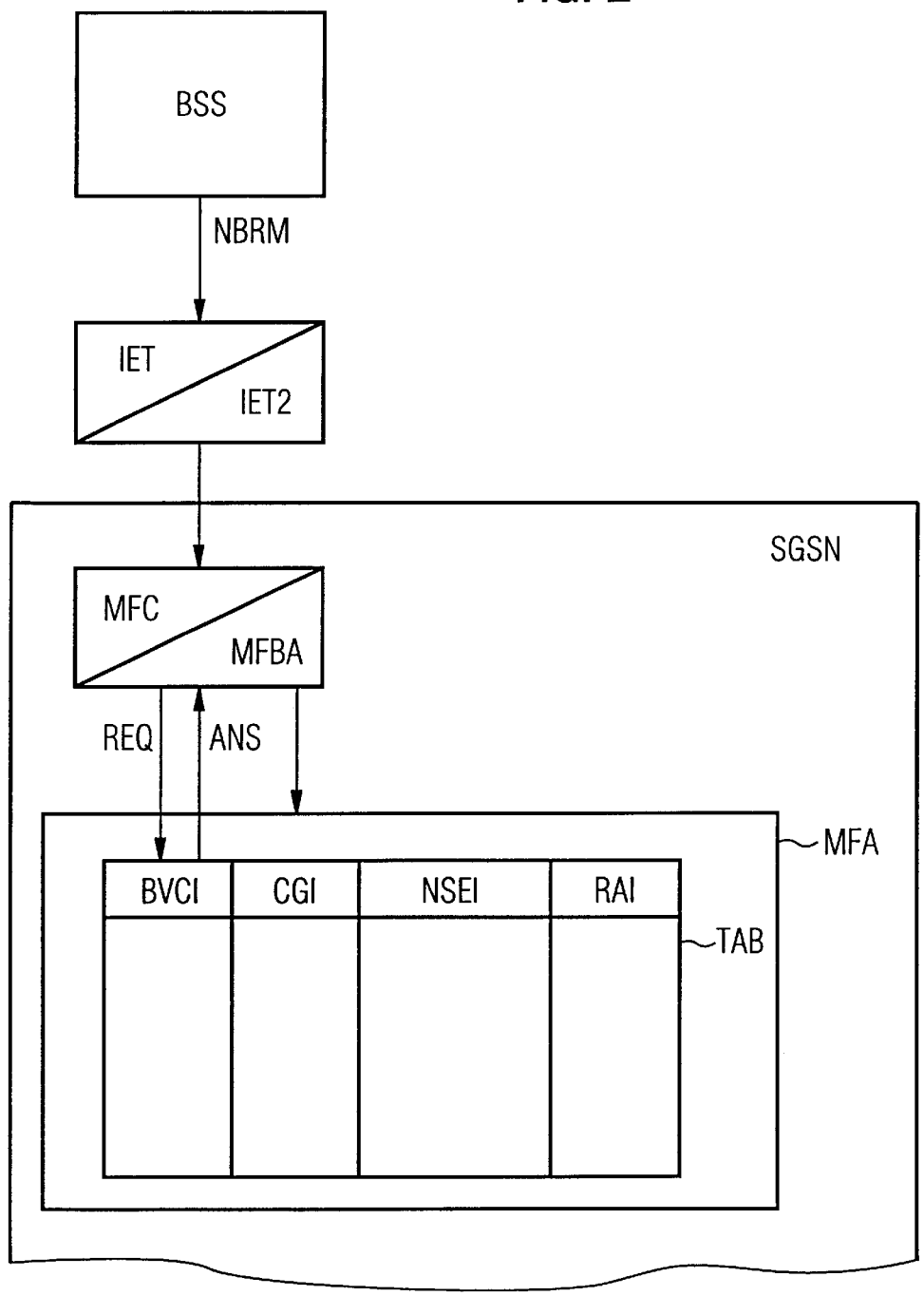
Figure 4:
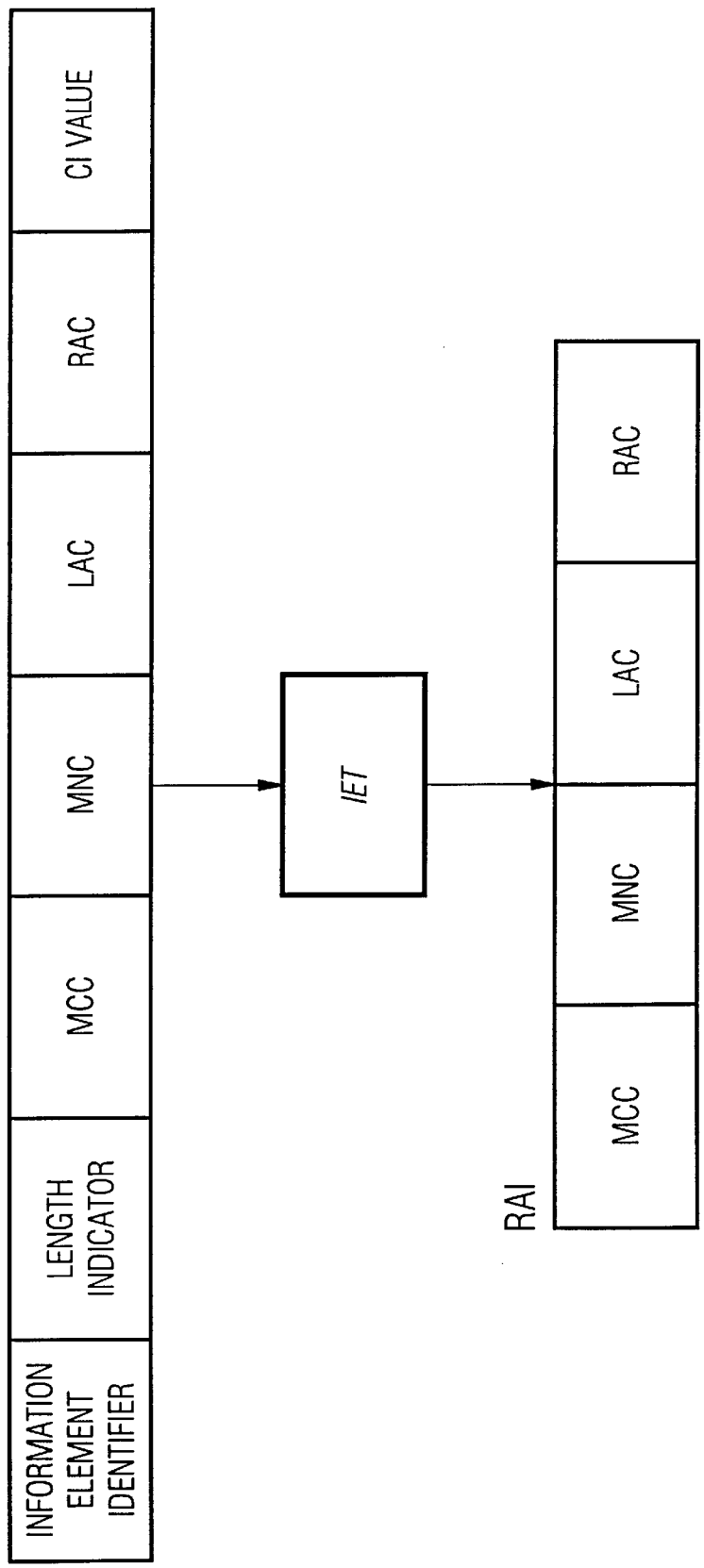
Figure 5:
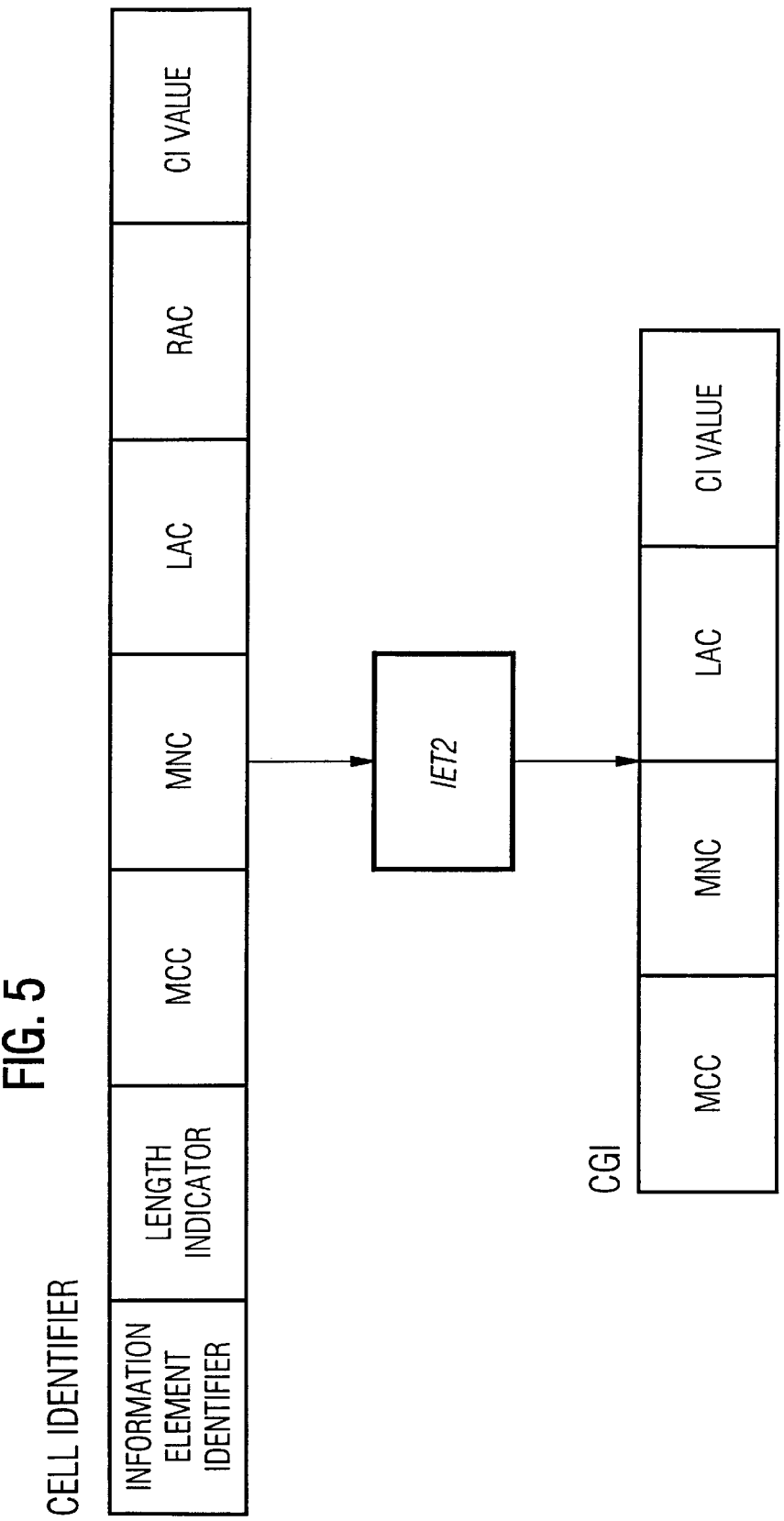
Figure 6:
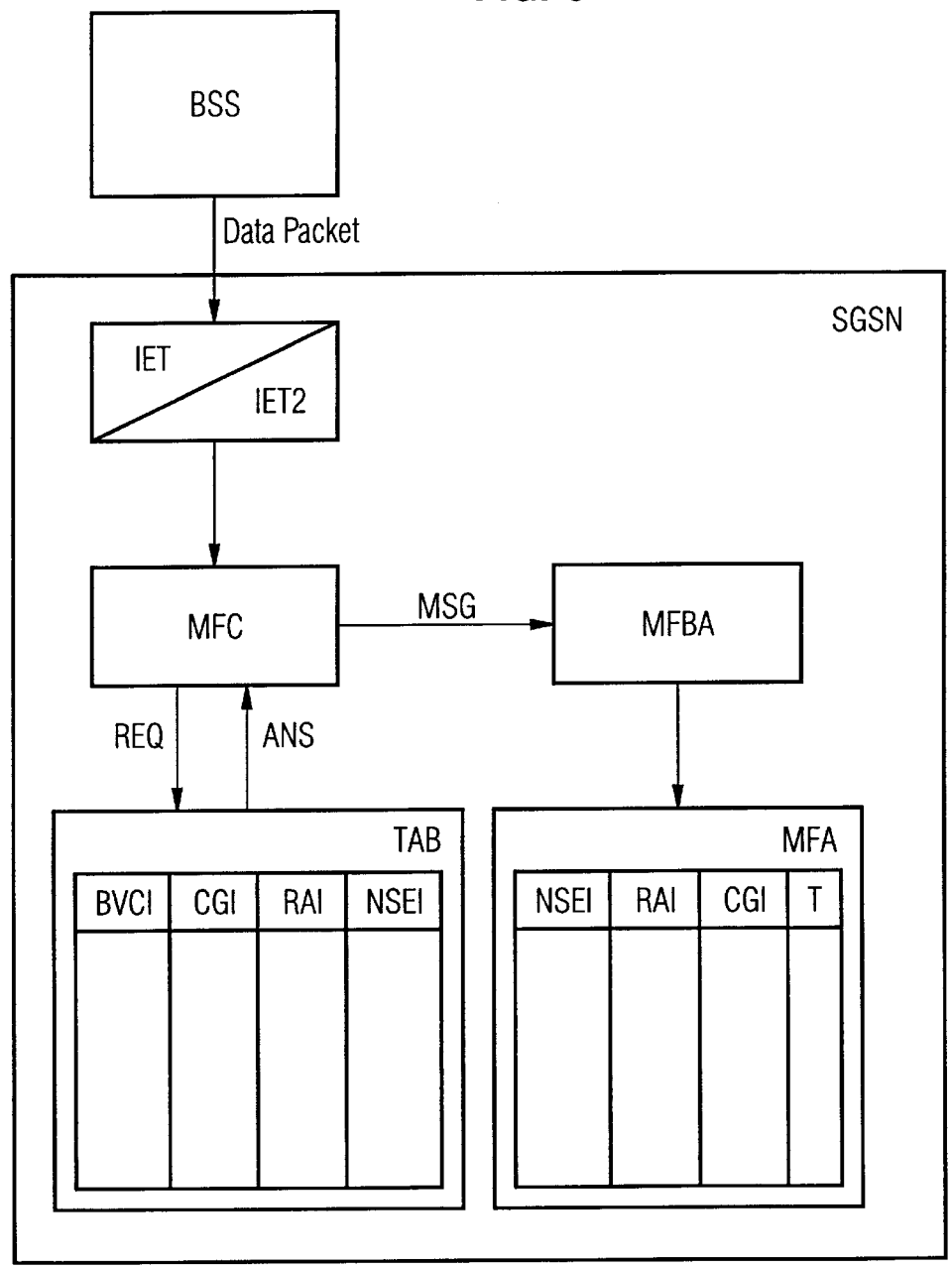
Figure 7:
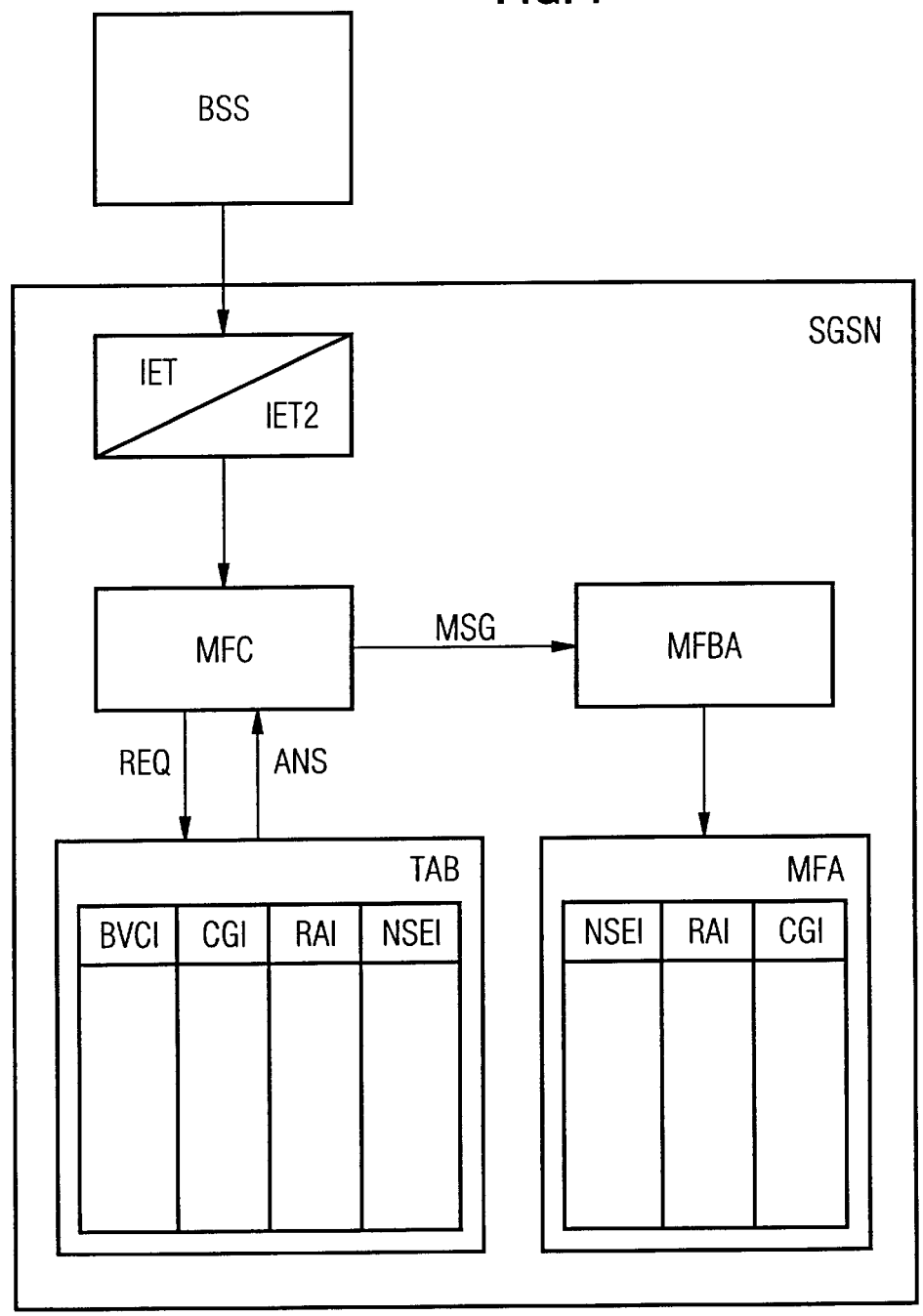

In the following the invention is explained in more detail by means of embodiments and figures, wherein FIG. 1. shows signaling routes between GPRS service nodes and base station subsystems (prior art), FIG. 2 shows a schematic illustration of the procedure upon the information on the set-up, release and modification of a virtual connection, FIG. 3a shows an example of an allocation table additionally comprising a cell global identifier, FIG. 3b shows an example of an allocation table allowing for multiple entries, FIG. 3c shows an example of an allocation table additionally comprising a counter value, FIG. 4 shows the conversion of a cell identifier to a routing area identity RAI, FIG. 5 shows the conversion of a cell identifier to a cell global identifier CGI, and FIG. 6 shows the schematic illustration of the procedure upon the extraction of information on the set-up, release and modification of a virtual connection from data packets, FIG. 7 shows the schematic illustration of the procedure upon the information on the set-up, release and modification of a virtual connection, wherein a table comprising information on existing virtual connections and an allocating means are realized independently from each other.

In the following, a signaling route of a GSM communication system offering a GPRS according to the prior art is explained. For this purpose FIG. 1 illustrates a section from such a signaling route according to Standard GSM 08.16 Version 6.1.0.

On the level of the network service protocol, a GPRS service node SGSN is represented by several network service entities NSE1 and NSE3. Said network service entities are each connected with a network service entity NSE2 or NSE4, respectively, via a network service virtual connection NSVC1 or NSVC2, respectively, in base station subsystems BSS1 or BSS2. In general, a base station subsystem and a GPRS service node can be connected with each other via more than one virtual connection. The network service entities of the network service connection are characterized by their network service entity identifiers NSEI1 and NSEI2. The network service entities connected with each other thereby have the same network service entity identifier in the GPRS service node SGSN and the base station subsystem BSS1 or BSS2. On the base station subsystem GPRS protocol layer, the so-called BSSGP layer, on top thereof, the network service virtual connections NSVC1 or NSVC2 are split into several virtual connections (base station system GPRS protocol virtual connections) BVC, via which, for instance, signals are transmitted.

Set-up and modification of a virtual connection are commonly initiated by a base station subsystem and communicated to a GPRS service node SGSN. No explicit message is provided in the standards for setting up one or more virtual connections. The detection of a release of one or more virtual connections commonly takes place implicitly, for instance, by using a new virtual connection identifier for a known cell. From this is concluded that the initial virtual connection has been disconnected. Another possibility is that a known virtual connection identifier is used for another cell, from which is concluded that the virtual connection has been modified. A release can also be detected by that a virtual connection used for signaling, usually the virtual connection number zero, is set up anew. This commonly deletes all virtual connections between a base station subsystem and a GPRS service node.

A base station subsystem informs the GPRS service node SGSN at least on the set-up and modification of virtual connections, for instance, by transmitting a so-called NM BVC RESET (Network Management BSSGP Virtual Connection Reset) message or by transmitting a so-called NM BVC RESET ACK message, in case a GPRS service node SGSN has initiated a connection set-up.

An NM BVC RESET message either shows that a modification or set-up of one or more virtual connections has already taken place, or requests the implementation thereof. A network service entity identifier NSEI of a forwarding base station subsystem BSS is known to a GPRS service node SGSN by means of the network service entity identifier of the network service entity which received the packet.

So much for the prior art, which was described herein for facilitating the person skilled in the art the association and comprehension of the invention, which is further explained in the following.

FIG. 2 shows one possible way how a GPRS service node SGSN detects and differentiates between a set-up, a release or a modification of a virtual connections by means of the information received in an NM BVC RESET message NBRM. Upon the receipt of an NM BVC RESET message NBRM in a GPRS service node SGSN—in FIG. 2, for instance, transmitted by a base station subsystem BSS—the information contained in the NM BVC RESET message NBRM are converted by data conversion means IET and IET2. The data conversion is optional and is here only introduced for illustrating the example. It is explained in more detail in the descriptions of FIGS. 4 and 5. Basically, the process can also be implemented with information elements contained in an NM BVC RESET message NBRM. The GPRS service node SGSN evaluates the information contained in the message in the checking and evaluating means MFC. The checking and evaluating means MFC and a means for the automatic set-up and for the automatic update MFBA have here exemplarily been realized to form a unit. For the purpose of checking, the checking and evaluating means MFC compares the information from the NM BVC RESET message NBRM with already existing information. For this purpose the checking and evaluating means MFC transmits a request REQ to a table TAB, which information on the one or more virtual connections in question are already available. Tables containing part of said information are prior art and are proposed, for example, in the ETSI Standard GSM 08.16 V6.1.0 Release 1998, Annex A in Table A.4. For carrying through the comparison required in the invention, a routing area identity is necessary. In accordance with the invention, the table known from the Standard was extended by the routing area identity RAI. The extension allows the automatic detection as to when a cell was allocated to another routing area. The table TAB delivers the information on already existing virtual connections concerned in a message ANS. If the information in the NM BVC RESET message NBRM for a known virtual connection differ from the known information, a modification or release of a virtual connection has taken place. If a virtual connection is not yet known, it is concluded that a set-up of said virtual connection takes place. In the case of a set-up, a modification or a release of one or more virtual connections the checking and evaluating means MFC delivers the relevant information to the means for the automatic set-up and for the automatic update MFBA. In respect of the example as shown in FIG. 2, the information refer to whether and which entries for virtual connections are to be deleted or entered anew as well as, if required, to data required for a new entry. As to which data are stored by the means for the automatic set-up and for the automatic update MFBA in the allocating means MFA depends on the information stored in the allocating means MFA, which is explained in more detail in the descriptions of FIGS. 3a, 3b and 3c.

The procedure illustrated in FIG. 7 entirely corresponds to the one already explained in FIG. 2. The differences between the situation in FIG. 7 and FIG. 2 consist in the different realization of the allocating means MFA. Instead of realizing the allocating means MFA together with a table TAB, which stores information on existing virtual connections, they are separated from each other in the conversion according to FIG. 7. Correspondingly also the checking and evaluating means MFC is separated from the means for set-up and update MFBA. Thereby the information flow between the allocating means MFA and the set-up and update means MFBA becomes more graphic. Thus, the message mentioned in the description of FIG. 3 is converted to one or more messages MSG.

The message NM BVC RESET is known from the GSM Standard 08.18 Version 6.2.0 Release 1997, published in October 1998. As to how the routing area identity and a cell global identifier can be obtained from the information contained in an NM BVC RESET message is explained in the following.

An information element—the so-called cell identifier—contained in the message is converted to a routing area identity RAI in the GRPS service node SGSN by means IET comprising means for converting data.

FIG. 4 shows as to how the means IET obtains a routing area identity RAI from a cell identifier. The cell identifier contains the following message elements: A message element for identifying the information element cell identifier, for instance, an identifier for information elements INFORMATION ELEMENT IDENTIFIER, a message element showing the length of the information element, for instance, a length indicator LENGTH INDICATOR, one or more message elements which clearly identify a location area, a routing area and a cell worldwide. Said identification can take place in several parts, for example, by using an identifier of a country where the network is located, for example, a mobile country code MCC, and an identifier of the network within said country, for example, a mobile network code MNC. After the network has unmistakably been identified worldwide, the location area, the routing area and the cell have to be clearly determined only within said network. This can be achieved in view of the location area by means of a location area code LAC. Within a network a routing area can be identified by means of a routing area code RAC and a cell by means of a cell identity CI.

The means for converting data of means IET generates said information, which clearly identifies a routing area worldwide, for instance, a routing area identity RAI, from message elements being contained in the cell identifier. A routing area identity RAI can be made up of the message elements mobile country code MCC, mobile network code, location area code LAC and routing area code RAC.

FIG. 5 shows as to how a cell global identifier CGI is obtained by means IET2 from a cell identifier. The means for converting data of means IET2 generates from message elements contained in a cell identifier the information, which clearly identifies a cell worldwide, for instance, a cell global identifier CGI. A cell global identifier CGI can be made up of the message elements mobile country code MCC, mobile network code MNC, location area code LAC and cell identifier value CI VALUE.

In a first embodiment said routing area identity RAI is stored in an allocating means MFA together with the network service entity identifier NSEI, a cell global identifier CGI and a virtual connection identifier. FIG. 3a shows as to how said information is stored, for instance, by a means for allocating routing area identities RAI to network service entity identifiers NSEI together with the cell global identifier CGI.

In this example, the allocating means MFA refers to a table. Further feasible realizations can, for example, be sorting trees or lists, in which the described information is stored. Both the sequence of individual entries and the sequence of data fields within one entry are exemplary and do not restrict the invention to the indicated sequence. If the checking and evaluating means MFC detects a set-up of a virtual connection, it informs the means for set-up and update MFBA that a further entry is to be introduced in the allocating means MFA. If the checking and evaluating means MFC detects a release of one or several virtual connections, it requests the means for the automatic set-up and for the automatic update MFBA to delete the corresponding entry or the corresponding entries from the allocating means MFA. If the checking and evaluating means MFC detects a modification of a virtual connection, it requests the means for the automatic set-up and for the automatic update MFBA to delete the old entry and to store a new entry with the updated data.

When a GPRS service node starts paging, it sends a routing area identity RAI to the allocating means MFA. Said means delivers all network service entity identifiers NSEI, which can be located with the indicated routing area identity RAI. In the case as illustrated in FIG. 3, this would be in the case of routing area identity RAI 1 the network service entity identifiers NSEI a and b with the cell global identifier CGI 1 to 5.

In a second embodiment a network service entity identifier NSEI and a routing area identity RAI are stored in the allocating means for each virtual connection. In an example, FIG. 3b shows the contents of a table, which illustrates one of the possible allocating means. Analogously to the illustration in FIG. 2, said table constituting the allocating means MFA can be realized together with a table TAB, which stores information on existing virtual connections. Analogously to the illustration in FIG. 7, it can, however, also be realized separately from the table. With each set-up of a virtual connection a combination of network service entity identifier NSEI and routing area identity RAI is stored. With each release of a virtual connection such a combination is deleted. A modification of a virtual connection constitutes a combination of set-up and release of a virtual connection, which means that an existing entry is deleted and replaced by a new entry. Due to the possibility to effect multiple entries for identical combinations, the table always contains as many entries as virtual connections exist. The procedure for a paging corresponds to the one described in the first embodiment. Upon a request of a GPRS service node, the allocating means is searched through by means of a routing area identity RAI. In this example, the search with a routing area identity RAI 1 provides for the network service entity identifiers NSEI a and b.

In a third embodiment also a counter value CNT is stored in the allocating means besides the routing area identity and the network service entity identifier. FIG. 3c illustrates a table showing one of the possible conversions of the allocating means. Said counter value CNT represents the number of virtual connections having an identical routing area identity RAI and network service entity identifier NSEI. In the case where a counter value is stored, the allocating means MFA has to be implemented separate from a table TAB, which stores information on existing virtual connections. If a new virtual connection is set up, said counter value is increased by one, or, if a combination of network service entity identifier NSEI and routing area identity RAI is concerned, for which there is not yet an entry, a new entry is generated. Analogously thereto the counter value CNT is reduced by one when a virtual connection is disconnected. In the case where a virtual connection for a specific combination of routing area identity and network service entity identifier no longer exists, two solutions are feasible. The corresponding entry is either deleted, or the corresponding counter value CNT is set to zero. In said example the corresponding entry is deleted and, if required, set up anew. A modification of a virtual connection constitutes a combination of a set-up and a release of a virtual connection. This means that the counter value for the previous combination of routing area RAI and network service entity identifier NSEI is reduced by one, or that the entry is removed, respectively, and that the counter value CNT is increased by one for the latest combination or a new entry is set up, respectively. The procedure for a paging corresponds to the one of the second embodiment. Upon a request by a GPRS service node the allocating means is searched through by means of a routing area identity RAI. In said example the search in a routing area identity RAI 1delivers the network service entity identifiers NSEI a and b. The counter value CNT is of no significance for a GPRS service node and is, therefore, not transmitted.

In a fourth embodiment information, which can be obtained from the transmitted data packets, are used for setting up and updating the allocating means.

For this purpose, the packets having been forwarded by a base station subsystem BSS to a GPRS service node SGSN are examined. FIG. 6 shows a possible way as to how such an examination can be carried out, and how, according to the results, the allocating means can be set up and updated. A base station subsystem BSS forwards a data packet to a GPRS service node SGSN. Each packet contains a cell identifier, from which a routing area identity RAI and a cell global identifier CGI can be obtained with the means described in FIGS. 4 and 5 comprising means for converting data IET and IET2. As packets can only be transmitted from a base station subsystem BSS to a GPRS service node SGSN via existing connections, a virtual connection identifier BVCI contained in a packet identifies such a connection.

A network service entity identifier NSEI of a relaying base station subsystem BSS is known to an examining GPRS service node SGSN through the network service entity identifier of the network service entity, which received the packet. The virtual connection identifier BVCI, the cell global identifier CGI, the routing area identity RAI and the network service entity identifier NSEI, which were obtained from the information contained in the data packet, are compared by the checking and evaluating means MFC with already stored information. For this purpose the checking and evaluating means MFC transmits a request REQ to a table TAB, which already has information on the virtual connection in question available. Tables containing parts of said information are, for instance, proposed as Table A.4 in ETSI Standard GSM 08.16 V6.1.0 Release 1998, published September 1998, Annex A. For the use of this table according to the invention, it still has to be extended by an information identifying a routing area. The extension allows for the automatic detection as to when a cell was allocated to another routing area. In this example a routing area is identified by a routing area identity RAI. The table TAB delivers the requested information in a message ANS.

If the information deviate from the stored information, a modification of the virtual connection is concluded. If the information is new, a new set-up of a virtual connection has taken place. A release of a virtual connection is assumed, if a certain time has passed since the last examination of an entry.

The checking and evaluating means MFC transmits a message MSG to the means for set-up and update MFBA. Said message MSG contains at least information as to whether a new entry for a virtual connection has to take place, or whether an existing entry is to be deleted. If an entry is to be deleted, the message MSG contains information which clearly identify an entry, for example, a cell global identifier CGI. If an entry is to be set up anew, the message MSG at least contains a network service entity identifier NSEI, a routing area identity RAI and a cell global identifier CGI. In the case of a modification of the virtual connection, the initial entry in the allocating means MFA is deleted by the means for set-up and update MFBA and a new entry for the updated virtual connection is set up. In this case the checking and evaluating means MFC transmits a message MSG for each new entry and for each deletion of an entry. An entry in the allocating means comprises in this embodiment a cell global identification CGI, a routing area identity RAI, a network service entity identifier NSEI and a timer value T. Said timer value T indicates the time at which the entry was examined for the last time. This time corresponds to the time, at which the last data packet was received via this virtual connection. If this time was before a certain threshold value, a release of the virtual connection is assumed. Said timer value T can be inserted by the allocating means independently. A possibility to control the time passed since a transmission consists in setting the timer value at a threshold value when effecting an entry or examining an entry. The timer values of all entries are then reduced by one at regular intervals. When an entry has reached the timer value value zero, it will be deleted.

If a virtual connection is set up, a new entry is set up in the allocating means MFA by the means for set-up and update MFBA. In the case that a release of a virtual connection has taken place, the entry in the allocating means MFA is deleted by the means for set-up and update MFBA. The allocating means can, for instance, be one or several tables, one or several sorting trees and one or several lists or combinations of said means.

The invention is not restricted to the embodiments illustrated in the examples, but can, among others, also be achieved through combinations of embodiments shown in the examples.

A combination of an embodiment setting up and updating allocating means by using the NM BVS RESET and NM BVC RESET ACK messages, and of an embodiment setting up and updating allocating means by using the information contained in the data packets can be particularly efficient.

What is claimed is:

1. A method for setting up and updating a determination of base station subsystems involved in a paging on a routing area level, for a Global System for Mobile Communication system offering a General Packet Radio Service, the method comprising the following steps:

evaluating signals sent by a base station subsystem;

determining an identifier of the base station subsystem;

detecting set-up, release, and modification of at least one virtual connection;

comparing existing information about said at least one virtual connection if the detecting step cannot be implemented;

identifying at least one virtual connection to be set up, released, and modified;

deleting, storing or updating identifying information about the at least one virtual connection, the identifying information comprising at least one of information identifying a base station subsystem involved in the at least one virtual connection and information identifying a routing area containing a cell involved in the at least one virtual connection.

2. The method according to claim 1, further comprising the steps of:

evaluating information from at least one data packet transmitted by said base station subsystem and an identifier of the base station subsystem; and comparing said information from said at least one data packet with existing information about said at least one virtual connections.

3. The method according to claim 1 further comprising the step of implementing multiple entries in an allocating means for identical combinations of said identifying information.

4. The method according to claim 1, further comprising the step of storing a counter value in an allocating means for each combination of said identifying information.

5. The method according to claim 1, wherein said signals comprise data packets.

6. The method according to claim 5, further comprising the steps of:

evaluating information from said signals transmitted by said base station subsystem, and comparing said information from said signals with existing information on at least one virtual connection if the evaluating step is not sufficient for the detecting step.

7. The method according to claim 1, further comprising the step of identifying said base station subsystem by a network service entity identifier.

8. The method according to claim 1, further comprising the step of identifying said routing area by a routing area identity.

9. The method according to claim 1, further comprising the step of storing information which identifies a virtual connection.

10. The method according to claim 1, further comprising the step of distinguishing virtual connections by information which identifies a cell.

11. The method according to claim 1, further comprising the step of identifying a cell by a cell global identifier.

12. The method according to claim 1, further comprising the step of storing a timer value for each combination of said identifying information.

13. The method according to claim 1, further comprising the step of determining, by means of information stored in an allocating means, which routing areas are covered by a service area of a General Packet Radio Service node.

14. A device for a Global System for Mobile Communication system offering a General Packet Radio Service, the device comprising:

means for automatic set-up and automatic update of an allocating means, said allocating means for sending information identifying at least one base station subsystem involved in a paging to a General Packet Radio Service node executing a paging on a routing area level; and a checking and evaluating means for evaluating information from at least one signal containing information on at least one virtual connection and an identifier of the base station subsystem which transmitted the at least one signal, said checking and evaluating means comparing said information on virtual connections with information on existing virtual connections if the information for detection and differentiation of set-up, modification and release of said at least one virtual connection is not sufficient, said checking and evaluating means identifying virtual connections to be set up, released and modified and communicating said identified virtual connections to said means for the automatic set-up and automatic update as to which steps have to be implemented in the allocating means.

15. The device according to claim 14, wherein the checking and evaluating means evaluates information contained in data packets.

16. The device according to claim 14, where in the allocating means allocates a base station subsystem by means of a network service entity identifier.

17. The device according to claim 14, wherein the allocating means allocates a routing area by means of a routing area identity.

18. The device according to claim 14, wherein the allocating means stores information which determines a base station subsystem and a routing area, and information which differentiates between individual virtual connections.

19. The device according to claim 18, wherein said device differentiates between said individual virtual connections by means of information which identifies a cell.

20. The device according to claim 19, wherein said device identifies said cell by means of a cell global identifier.

21. The device according to claim 14, wherein said allocating means stores multiple entries of identical combinations of information determining a base station subsystem and a routing area.

22. The device according to claim 14, wherein the allocating means stores a counter value.

23. The device according to claim 14, wherein the allocating means stores a timer value.

24. The device according to claim 14, further comprising determining means which determines, by information stored by the allocating means, which routing areas are covered by a service area of a General Packet Radio Service node.

* * * * *